United States Patent
Dice et al.

(10) Patent No.: US 7,200,846 B2
(45) Date of Patent: Apr. 3, 2007

(54) SYSTEM AND METHOD FOR MAINTAINING DATA SYNCHRONIZATION

(75) Inventors: David Dice, Foxborough, MA (US); Paula J. Bishop, Foxboro, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 564 days.

(21) Appl. No.: 10/212,509

(22) Filed: Aug. 5, 2002

(65) Prior Publication Data

US 2004/0025160 A1 Feb. 5, 2004

(51) Int. Cl.
*G06F 9/00* (2006.01)
(52) U.S. Cl. .................... 718/102; 713/193; 714/2; 710/200
(58) Field of Classification Search ................ 718/100, 718/102, 107, 108, 105; 710/200, 260, 264; 713/193; 714/2
See application file for complete search history.

(56) References Cited

U.S. PATENT DOCUMENTS

| | | | |
|---|---|---|---|
| 5,515,538 | A | 5/1996 | Kleiman |
| 5,630,136 | A | 5/1997 | Davidson et al. |
| 6,108,744 | A | 8/2000 | Lebee |
| 6,301,676 | B1 | 10/2001 | Kumar et al. |
| 6,349,322 | B1 | 2/2002 | Shaylor |

OTHER PUBLICATIONS

Monitors, "Monitors & Critical Regions", May 2000, pp. 1-5.*
Asche, "Emulating Operating System Synchronization in Win32 Applications", 10-197, pp. 1-9.*
Ditze, "A Customizable Library to support Software Synthesis for Embedded Applications and Micro-Kernel Systems", Sep. 1998, ACM Press, pp. 88-95.*
DCE for the HP 3000, MPE/iX 5.0 Express III Documentation, http://docs.hp.com/cgi-bin/doc3k/BB382190002.13998/25, Hewlett-Packard, Palo Alto, CA 1995, pp. 1-2.
Bershad et al., Fast Mutual Exclusion for Uniprocessors, Proceedings of the Fifth International Conference on Architectural Support for Programming Languages and Operating Systems (ASPLOS V), ACM Press, New York, NY, 1992, pp. 223-233.
Johnson et al., Interruptible Critical Sections, Technical Report TR94-007, University of Florida, Gainesville, FL, 1994, pp. 1-28.
Bateman, R., Features of the Novell Kernel Services Programming Environment for NLMs: Part Two, Novell DevNote, Novell Incorporated, Provo, UT, Oct. 1999, pp. 1-15.
Guide to POSIX Threads Library, Open VMS Documentation, Computer Computer Corporation, 2001, http://www.openvms.compaq.com, pp. 1-7.

(Continued)

*Primary Examiner*—Meng-Al T. An
*Assistant Examiner*—Phuong N. Hoang
(74) *Attorney, Agent, or Firm*—Chapin IP Law, LLC; Barry W. Chapin, Esq.

(57) ABSTRACT

When a thread of program execution on a computer system is executing a critical code section, i.e., a code section whose preemption could result in inconsistency, it asserts an indicator of that fact. When the system's scheduler reschedules the thread for execution, it determines whether the indicator is asserted. If the indicator is asserted, the scheduler does not cause the thread immediately to resume execution where the thread left off when it was preempted. Instead, the scheduler has the thread's signal handler execute in such a manner that the thread performs inconsistency-avoiding operations.

23 Claims, 9 Drawing Sheets

OTHER PUBLICATIONS

Hang Protection Mechanism, IBM® Technical Disclosure Bulletin, vol. 37 No. 8, Aug. 1994 (p. 163).

Kontothanassis, et al., Scheduler-Conscious Synchronization, ACM Transactions on Computer Systems, vol. 15, No. 1, Feb. 1997, pp. 3-40.

Michael, et al., Non-Blocking Algorithms and Preemption-Safe Locking on Multiprogrammed Shared Memory Multiprocessors, Journal of Parallel and Distributed Computing, vol. 51, No. 1, May 25, 1998, pp. 1-24.

* cited by examiner

102 - RESTORE USER STATE //RESTORE THE USER'S RUNTIME STATE
104 - RETRY //IF THE PSW.INCRIT FLAG IS SET,
//CONTROL TRANSFERS TO
//INCRIT_TRAP_HANDLER

106 {
INCRIT_TRAP_HANDLER:
108 - CLEAR THE SAVED PSW.INCRIT BIT
110 - FABRICATE A USER-MODE SIGNAL
112 - ARRANGE FOR CONTROL TO PASS TO THE USER-MODE SIGNAL HANDLER
114 - RETRY //WON'T TRAP

FIG. 1

601 - RESTORE USER STATE //RESTORE THE USER'S RUNTIME STATE

602 - MOV    %TSTATE, %R1    //MOVE THE SAVED PSW VALUE TO REG R1

604 - ANDCC %R1, INCRIT, %G0    //TEST FOR INCRIT BIT IN PSW
606 - BNZ    GENERATESIGNAL    //IF INCRIT BIT SET, GO TO GENERATESIGNAL
608 - NOP    //NO OPERATION
610 - RETRY    //OTHERWISE, RESUME EXECUTION
    OF THE THREAD

620 {
GENERATESIGNAL:
614 - GENERATE A USER-MODE SIGNAL
616 - ARRANGE FOR CONTROL TO PASS TO THE USER-MODE SIGNAL HANDLER
618 - RETRY    //RESUME EXECUTION OF THE THREAD

FIG. 6

SYSTEM AND METHOD FOR MAINTAINING DATA SYNCHRONIZATION

CROSS-REFERENCE TO RELATED APPLICATIONS

The present invention is related to co-pending and commonly assigned U.S. patent application Ser. No. 09/452,571, titled "Mutual Exclusion System And Method For Uniprocessor Digital Computer System," which was filed on Dec. 1, 1999, by David Dice and is hereby incorporated by reference as though fully set forth herein.

BACKGROUND OF THE INVENTION

1. Field of the Invention

This invention relates to computer systems and more particularly to a system and method for maintaining data synchronization among software tasks.

2. Background Information

A computer system can roughly be divided into the following parts: hardware, operating system, application programs, and users. The hardware provides the basic computing resources. The application programs utilize these resources to solve problems for the users. The operating system provides an environment within which the application programs can run as software tasks to do useful work. An operating system can be designed to run only one software task at a time, or it may be capable of running multiple software tasks at a time concurrently. A typical operating system comprises a kernel which is usually made up of a series of software routines, often called "kernel routines," that typically handle certain low-level tasks such as, e.g., memory allocation, processing input/output (I/O)-device requests, processing hardware trap conditions, and scheduling software tasks.

The operating system typically runs in a mode known as "kernel mode," and the software tasks typically run in a mode known as "user mode." The kernel mode is typically a privileged mode of operation, in which the software is granted full access to the system resources. Software operating in user mode, on the other hand, is often granted only limited or no direct access to the system resources. To gain access to a restricted resource, software running in user mode typically calls a kernel routine.

A multiprogramming operating system provides an environment in which several application programs can run in the computer system concurrently. In this context, each such separate program is referred to as a different "process." A process is a program in execution. Since only one concurrently running process can actually be executing at any given time in a uniprocessor system, concurrency is typically achieved in such systems by assigning time slots to different processes and scheduling processes to take control of the processor for their respective time slots. Scheduling is often handled by a separate operating-system functional section called a scheduler, which is typically part of the operating system's kernel.

When a given process reaches the end of its assigned time slot, the scheduler preempts that process. The operating system takes control of the processor from the process and gives it to the next process to be scheduled.

Preemption is typically performed as follows. When the time slot ends for a running process, the processor switches to kernel mode, an interrupt is generated, and control of the processor is turned over to the operating system. The operating system saves the process's execution context, i.e., saves various run-time state associated with the process, and its scheduler schedules the next process to run in the system. Examples of state information that is often part of the execution context are items such as the memory map, general-purpose-register values, various system-register values, processor status words (PSWs), the program-counter (PC) value, in some architectures the next-program-counter (nPC) value, and stack information, including the contents of the run-time stack. The program counter points to the instruction that is to be executed when the process resumes execution. For reasons that will be explained below, the next program counter points to the instruction to be executed after the instruction pointed to by the program counter.

Once the scheduler selects the next process to be run, it restores any saved context associated with the process, assigns it a time slot, switches from kernel mode to user mode, and grants control of the processor to the selected process. The operation of saving one software task's context and replacing it with another's is known as a context switch.

In some multiprogramming operating systems, the concept of time sharing among processes is extended further to include the notion of sharing among threads of execution ("threads") of the same process. Just as different processes are different programs that in a multiprogramming operating system are executed concurrently, different threads are different concurrently executing flows of control within a process.

Typically, operating systems that support threads are organized in such a manner that each individual thread running in the system has its own separate execution context. A thread's execution context is like a process's, but, whereas different processes typically have different memory maps, different threads of the same process do not. And an operating system's scheduling of threads is similar to its scheduling of processes; whenever a thread reaches the end of its time slot, the operating system halts the thread's execution, selects the next thread for execution, restores its execution context, and hands control of the processor to the selected thread. The selected thread then resumes execution at the instruction pointed to by the saved PC value.

Since threads within a multithreaded process usually share a single address space, a process's different threads typically can read and write the same memory locations. This can sometimes give rise to consistency problems. Suppose, for example, a data object represents a bank-account balance and that multiple threads employ a critical section of code to make additions to the account. The code directs the thread to read the shared object, add the deposit value to the value that is read, and write the result back into the object. Now suppose a first thread is executing this code section and reaches the end of its assigned time slot just after it has read the object. Further assume that a second thread is then scheduled and manages to complete enough of that code section to read the object, calculate a new value, and write the new value back into the object. In the absence of a mechanism for what I will refer to below as a "synchronization," the first thread will not be aware of the shared data object's new value when it is rescheduled, so it continues execution by basing calculation of its new value on the "old" value that was read and by writing the new data value into the shared data object. It thereby "destroys" the data value that was written by the second thread. The data thus become inconsistent: it will be as though the deposit that the second thread was to perform did not happen.

To avoid such problems, multithreaded processes often employ various synchronization techniques. One synchronization approach employs "locking mechanisms." Locking mechanisms basically control access to a shared data object by allowing a thread access to a shared data object only if the thread has a "lock" associated with the object. In such a scheme, a thread must first acquire the lock before it accesses the data object. A lock is typically a field that is associated with a data object and indicates whether a thread is already in possession of the object. In a mutual-exclusion arrangement, the operating system grants the lock to a thread only if no other thread is currently in possession. A thread that has the lock can safely manipulate the data object without interference from other threads.

Locking mechanisms provide a simple yet effective way to synchronize access to shared data. But program code must be carefully designed so as to avoid problems associated with locking mechanisms, such as "starvation" or "deadlock." Starvation occurs when one or more threads are blocked from gaining access to a resource because another thread has control of that resource. The blocked threads are said to be "starved" because they cannot gain access to the locked resource and thus cannot make progress.

To understand deadlocks, consider an example in which a shared data area contains two data objects named O1 and O2. Further assume that each object has only one lock associated with it. Now suppose that thread T1 acquires the lock on O1 and thread T2 acquires the lock on O2. Further assume that thread T1 is at a point in its code where it needs the lock on O2 before it can continue to a point at which it can release its lock on O1. Likewise assume that thread T2 is at a point in its code where it needs the lock on O1 before it can continue to the point at which it releases the lock on O2. Since T2 cannot release the lock on O2 until T1 releases the lock on O1, but T1 cannot release the lock on O1 until T2 releases the lock on O2, the threads are deadlocked: neither can continue. Deadlock situations can be avoided by carefully crafting the code to ensure that locks are always acquired in the same order. But this may not be a practical solution in complex systems that employ many thousands of locks.

One synchronization approach that does not use locks and thus avoids some of their drawbacks uses a restartable atomic sequence ("RAS") to ensure data consistency. A RAS is a section of code so written that executing it from the beginning eliminates any inconsistency that might otherwise result from preemption in the middle of its execution. Synchronization approaches that utilize RASs often employ a "signal" mechanism that informs the code that a context switch has occurred and that atomic execution of the critical section may therefore have been compromised. A signal is a communication sent between the kernel and a software task that communicates the occurrence of certain events external to the task, such as the rescheduling of a process while in a critical code section. A signal can take many forms. For example, a signal can be a bit that is set in a processor status word (PSW), or a code that is placed on the software task's stack, or a data value that is placed in a particular shared memory location, or a call to a signal handler associated with the task. In response to the signal, the software task typically determines whether it is in a section of code that is to be executed in an atomic manner. If so, the software task restarts the code execution at the beginning of the RAS.

A synchronization technique that utilizes RAS and employs a signaling mechanism is described in commonly owned co-pending U.S. patent application Ser. No. 09/452,571 for a "Mutual Exclusion System and Method for Uniprocessor Digital Computer System" which was filed on Dec. 1, 1999, by David Dice. In that technique, an executing thread can arrange to be notified if it has been interrupted. The mechanism employed for this purpose is that the thread asserts what the application refers to as a non-restorable trap (NRT) indicator when it is in a critical-code section, i.e., in a code section whose preemption could lead to inconsistency. When the operating system restores the thread's state, it checks the NRT indicator. If it determines that the NRT indicator is set, the operating system traps, and a trap handler that processes the trap causes a signal to be delivered to the thread. When the thread resumes execution, it receives the signal and takes whatever corrective measures are deemed necessary, such as (in the case of an RAS) returning to the beginning of the critical section. If the NRT indicator is not set, on the other hand, the thread resumes where execution left off when the thread was last preempted.

SUMMARY OF THE INVENTION

I have now devised an advantageous approach to implementing this technique. This approach is best described by contrasting it with what would be the normal way in which the technique would be implemented. To enable a processor to implement this technique, one would be inclined to modify the processor's thread-resumption instruction so that it generates a hardware trap if the contents of the NRT indicator's location have been set. For example, FIG. 1 illustrates an approach in which such an instruction, in this case the SPARC™ "retry" instruction, has been so modified as to generate a hardware trap and call a trap handler 106 if a critical-code indicator has been set. In this example, the indicator is a bit in the thread's saved PSW referred to as "INCRIT."

The operation represented by the pseudo-code at line 102 restores the user's context. At line 104, the retry instruction is executed conventionally. As is conventional, this instruction switches the execution context from kernel mode to user mode and resumes execution of a thread at the instruction pointed to by the thread's saved PC value. Since the processor has been modified as just described to implement the previous application's technique, though, the retry instruction's execution also includes testing the PSW's INCRIT bit. And, if that bit is set, the retry instruction's execution additionally includes switching the context from user mode back to kernel mode and generating a hardware trap. The trap handler thereby invoked notifies the resuming thread of the preemption during a critical-code section by creating a user-mode signal, e.g., by setting a bit in the thread's PSW. As line 114 indicates, the retry instruction is again executed to pass control to the user thread, but this time the trap is not generated, because the hardware-trap handler has cleared the INCRIT bit.

I have recognized, though, that a significant performance advantage can be obtained by instead employing a software implementation. That is, I do not so modify the processor that the thread's critical-code-section indicator is inherently tested by the operation performed in response to the thread-resumption operation code, i.e., by the operation code that causes the thread's user-mode operations to resume. Instead, I employ combinations of conventional instructions, whose operation codes do not inherently result in testing the critical-section indicator, but which software-provided instruction parameters cause to do so and to notify the resuming thread in response. Although one might be inclined to think that it would be expensive operationally thus to use multiple instructions to do what an appropriately modified single instruction could do, I have recognized that, as will be shown below, the software approach can often save a context switch, which is an expensive operation.

BRIEF DESCRIPTION OF THE DRAWINGS

The invention description below refers to the accompanying drawings, of which:

FIG. 1 described above, is a listing of a code fragment that illustrates a synchronization approach that relies on a modified "retry" instruction and a hardware-trap mechanism;

FIG. 6 is a listing of a code fragment that illustrates the software approach used in one implementation of the present invention.

DETAILED DESCRIPTION OF AN ILLUSTRATIVE EMBODIMENT

Figure 2:
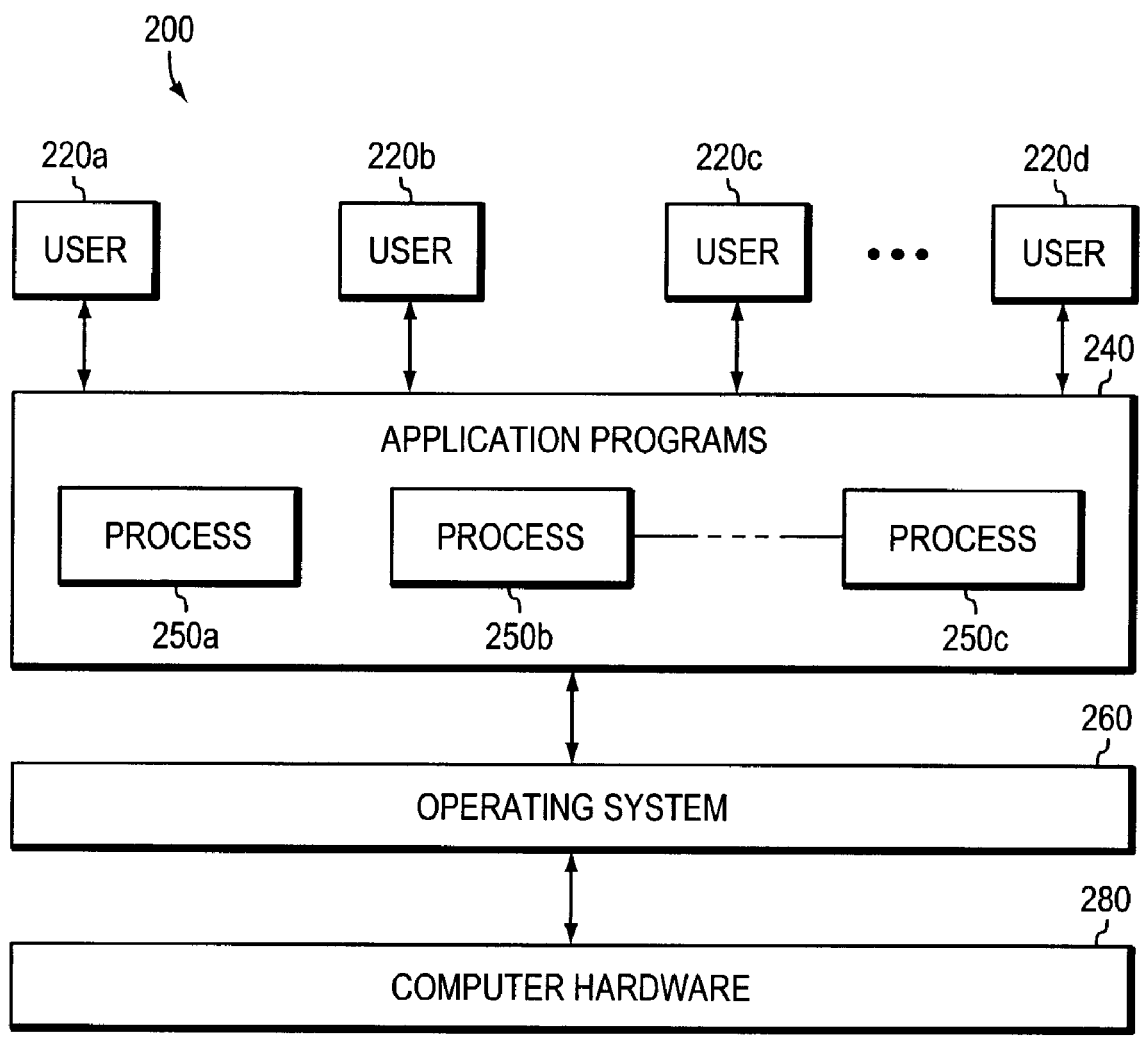
FIG. 2 is an illustration of one type of digital-computer system in which the present invention's teachings may be implemented.

FIG. 2 illustrates a typical computer system 200. The computer system 200 includes computer hardware 280, an operating system 260, application programs 240, and one or more users 220. The operating system 260 comprises software that executes on the computer hardware and provides an environment within which the application programs 240 can execute as processes 250. The application programs 240 interact with the users 220 and utilize the resources provided by the operating system 260 and hardware 280 to solve problems for the users 220.

Figure 3:
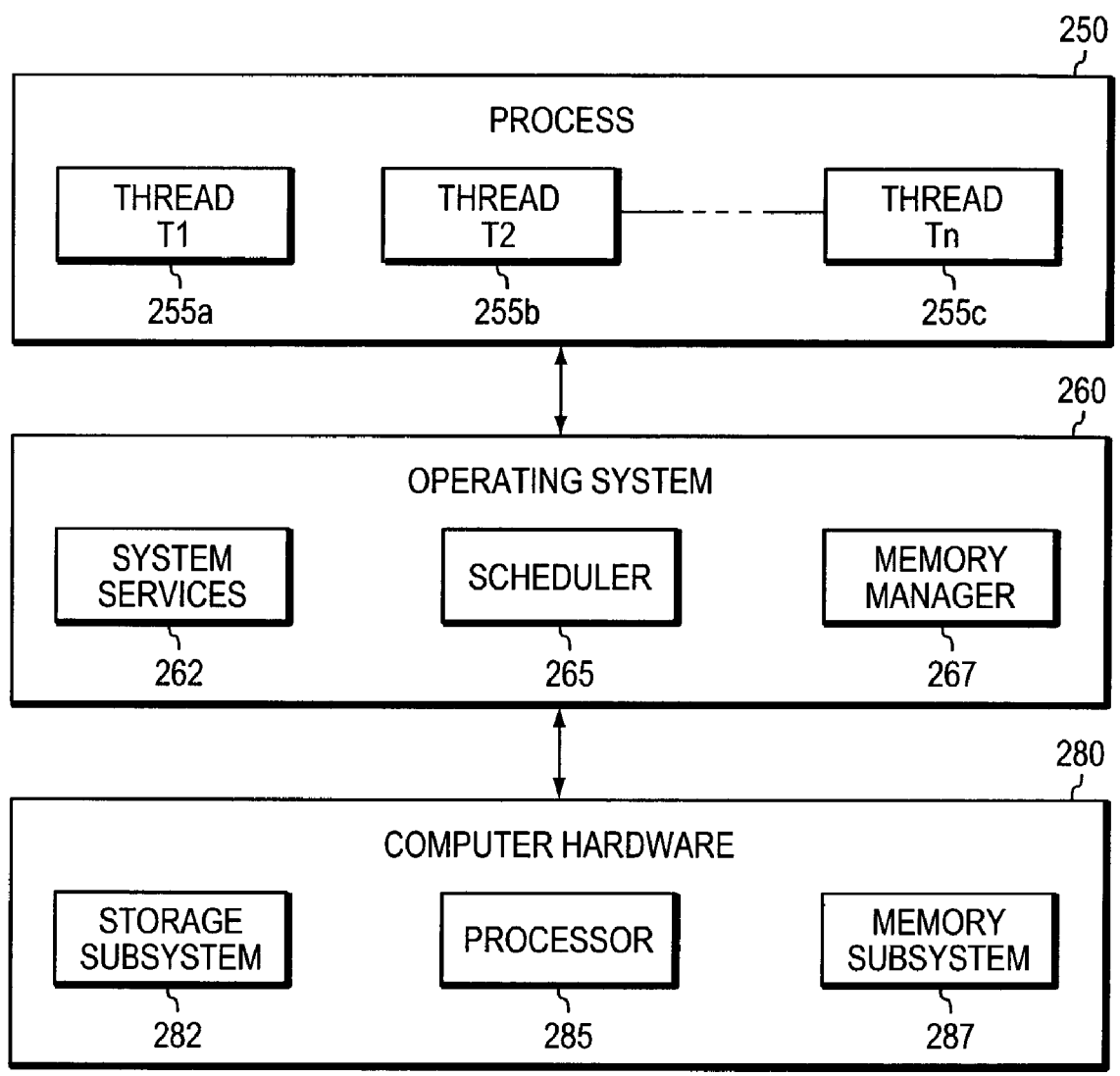
FIG. 3 is a more-detailed block diagram of part of the computer system of FIG. 2.

FIG. 3 is a more-detailed block diagram of the computer system 200's computer hardware 280, operating system 260, and one process 250. The computer hardware 280 comprises a storage subsystem 282 for storing information persistently in, e.g., disks or tape units, a processor 285 for executing software, and a memory subsystem 287 typically consisting of random-access memory ("RAM") that holds software and associated data while the processor 285 uses them. The processor 285 can write and read data to and from both the memory subsystem 287 and the storage subsystem 282. The storage subsystem 282 typically stores as computer-executable instructions both the operating system 260 and the application programs 240 and thus, as will be seen, the code that enables the system to implement the invention.

The processor 285 may include a single central processing unit (CPU) or multiple central processing units. An example processor that may be advantageously used with the invention is the Scalable Processor ARChitecture (SPARC™) processor available from Sun Microsystems, Inc., Palo Alto, Calif. (SPARC and related marks are owned by SPARC International, Inc. and licensed to Sun Microsystems, Inc.) The processor 285 may include various registers, including general-purpose registers and various control and status registers that it uses in performing its operations. The control and status registers include, as is conventional, a stack-pointer register, a frame-pointer register, and a processor-status-word (PSW) register. The PSW provides various control and status information, such as condition codes, arithmetic-overflow status, interrupt-mask bits, etc., that software running on the system 200 can access. Preferably, the PSW also contains an indicator bit that software can use conventional instructions provided by the processor's instruction set to read and write.

As was stated above, the operating system 260 basically manages the hardware resources 280 and provides an environment for the application programs 240 (FIG. 2) to run as processes 250. The operating system 260 preferably is a multithreaded operating system, such as the Solaris™ 8 operating system available from Sun Microsystems, Inc., Palo Alto, Calif. (Sun, the Sun Logo, Sun Microsystems, and Solaris are trademarks or registered trademarks of Sun Microsystems, Inc., in the United States and other countries.) The operating system 260 includes system services 262, a scheduler 265, and a memory manager 267.

The system services 262 provide, among other things, access routines that the application programs 240 can call to gain access to system resources that the operating system strictly controls, such as the file system or devices attached to the system. In addition, the system services 262 often include system routines that a software task, such as a process or thread, can call to create and control other software tasks.

The scheduler 265 is configured to assign time slots for each thread 255 and schedule these threads 255 for execution within the respective time slot. The scheduler implements a scheduling algorithm that decides when a thread 255 should be scheduled to run. Scheduling algorithms are widely known in the art of computer programming. Examples of scheduling algorithms that can be used with the present invention can be found in standard texts such as A. Tanenbaum et al., Operating Systems Design and Implementation, second edition, 1997, available from Prentice-Hall, Inc., Upper Saddle River, N.J.

The memory manager 267 is configured to manage the memory subsystem 287's resources. The memory manager fulfills requests from the threads 255 to allocate and deallocate memory resources. Preferably, the memory manager 267 is configured to provide a separate virtual-address space for each process 250 created by the operating system. As was stated above, the various threads of the same given process 250 share the same virtual-address space, but each thread 255 has its own separate execution context. Methods for providing a virtual-address space to a process are well known in the art of computer programming, and examples that can be used with the present invention can be found in the standard texts.

Suppose that one of the users 220 wishes to run an application program on the computer system 200. The user 220 selects the application program to run and directs the operating system 260 to start it. The operating system 260 typically locates the application program in the storage subsystem 282, loads the application program into the memory subsystem 287, and creates and initializes a process 250 to hold the state needed for the selected application program's execution. As part of the process's initialization, the operating system 260 may direct the memory manager 267 to allocate a virtual-address space for the process 250. Moreover, the operating system 260 typically performs the necessary initialization to create a thread of execution 255a ("thread T1"). That initialization includes creating an execution context for the thread T1 and directing the scheduler 265 to allocate a time slot for thread T1 and schedule thread T1 to run.

Now assume that, while thread T1 is running, it calls the appropriate system services 262 to request that the operating system 260 create a second thread 255b ("thread T2"). In response to the request, the operating system 260 performs the necessary initialization to create thread T2, including creating a separate execution context for thread T2 and directing the scheduler 265 to assign a time slot to thread T2 and schedule thread T2 for execution.

Figure 5:
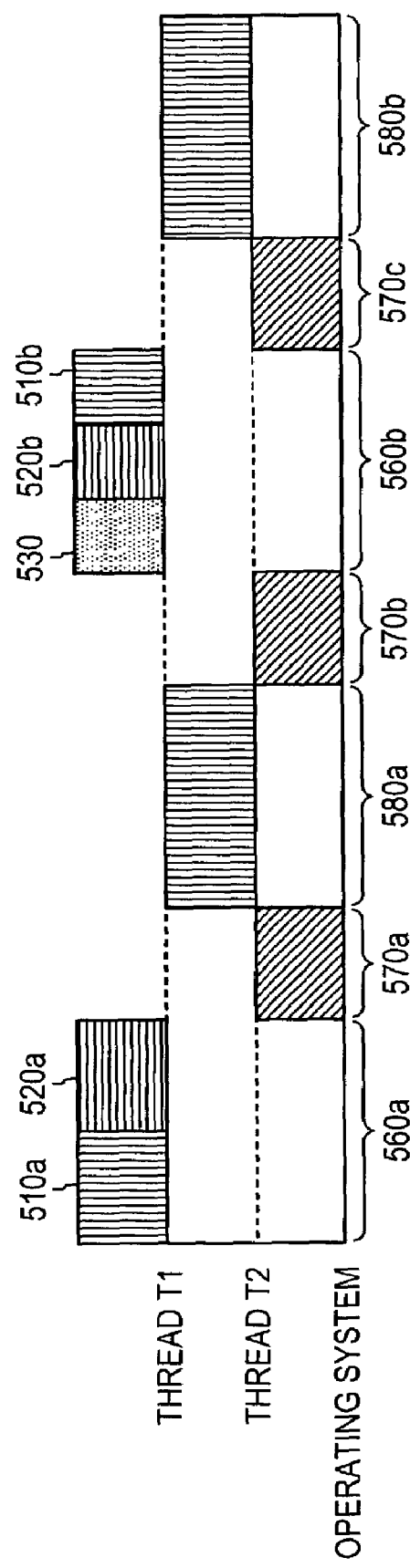
FIG. 5 is a timing chart that illustrates a time window encompassing two threads' time slots.

FIG. 5 is a timing diagram that illustrates how the scheduler causes thread T1 and thread T2 to execute concurrently on a single-processor system. Time slots 560a and 560b are two of the slots allocated to thread T1, while time slots 580a and 580b are two of the time slots allocated to thread T2. The operating system executes in slots 570a, 570b, and 570c for scheduling and other purposes.

Figure 4A:
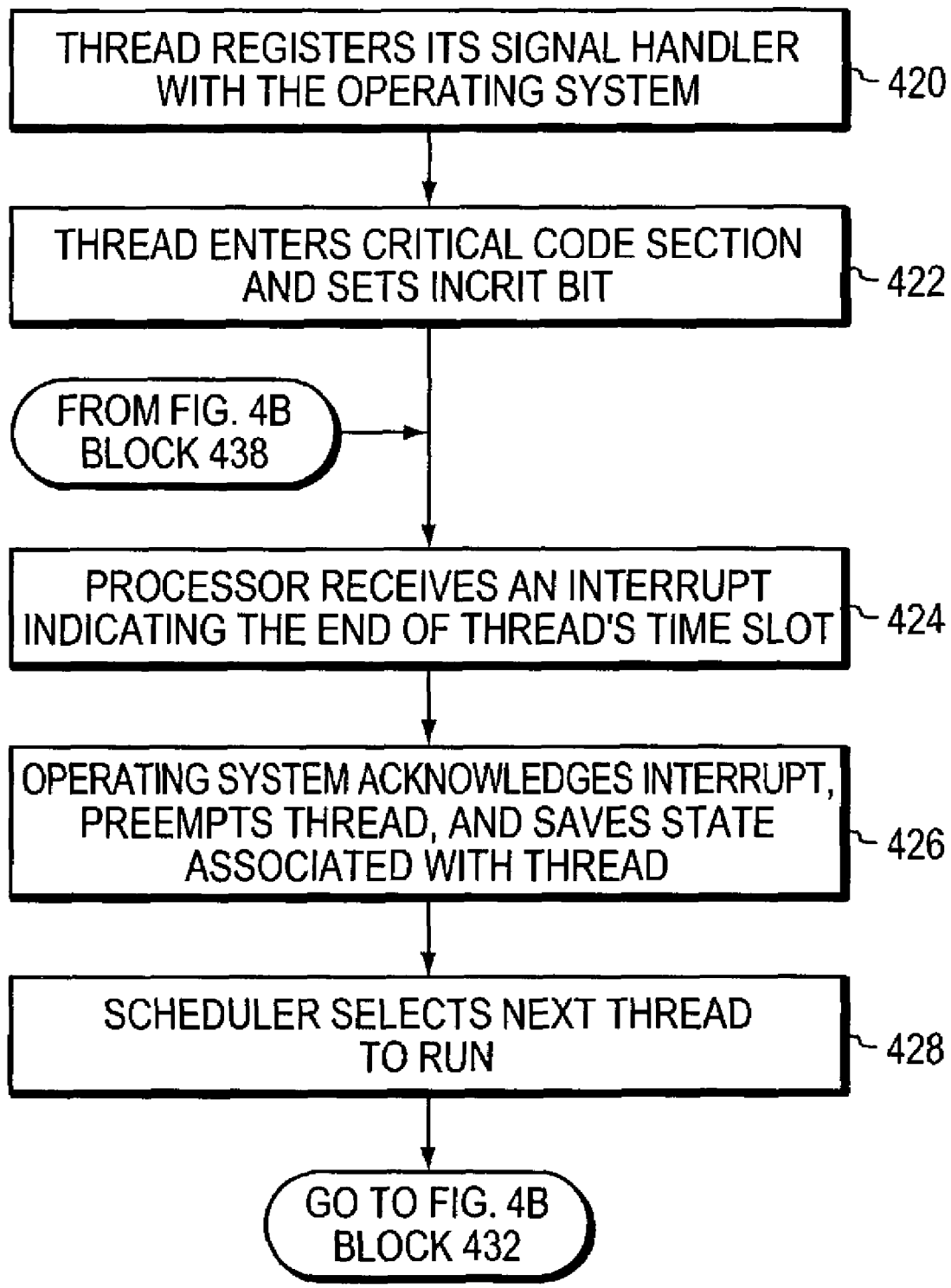
FIGS. 4A–C are a flow diagram that can be advantageously used to implement the present invention.
Figure 4B:
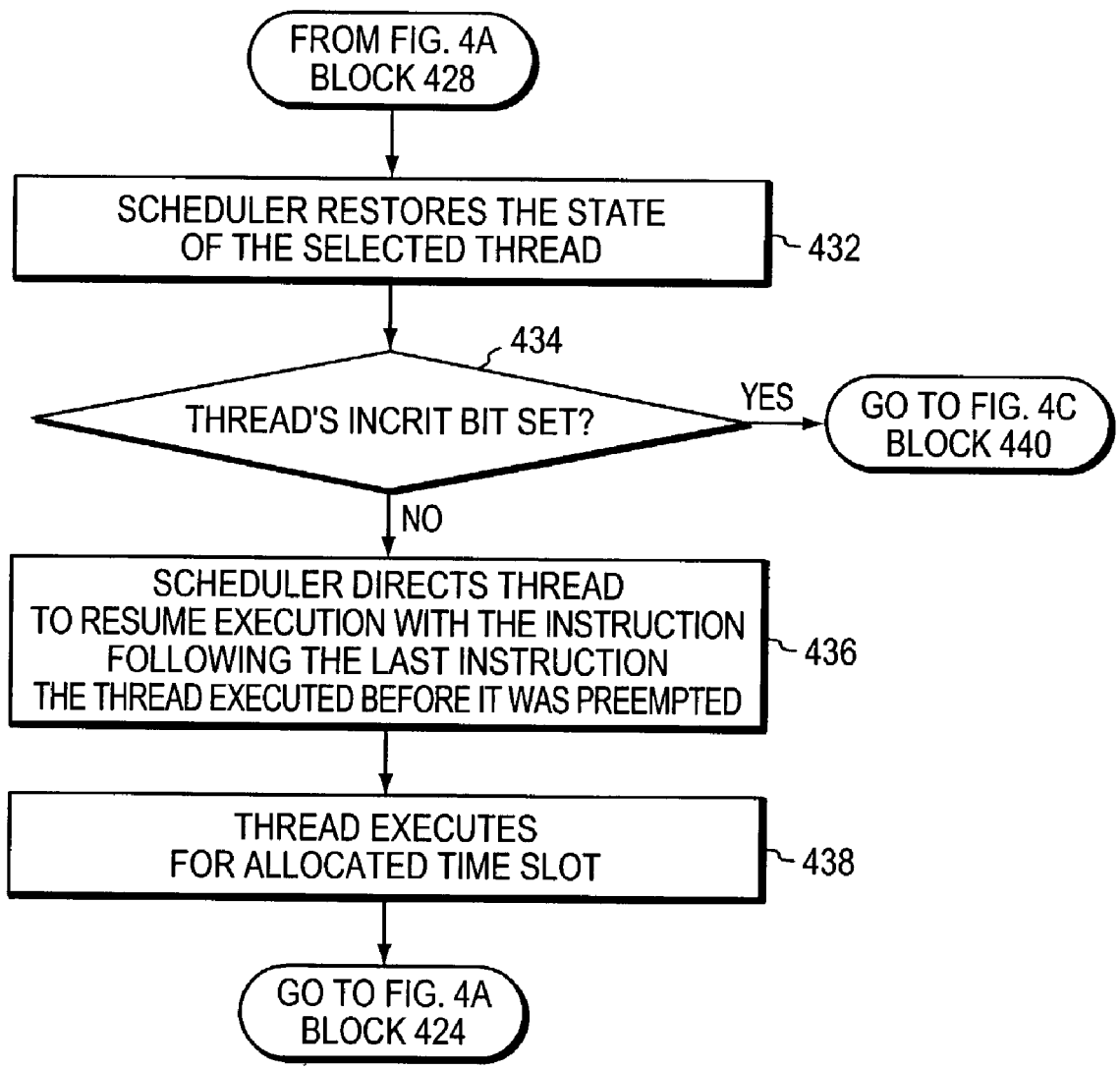
Figure 4C:
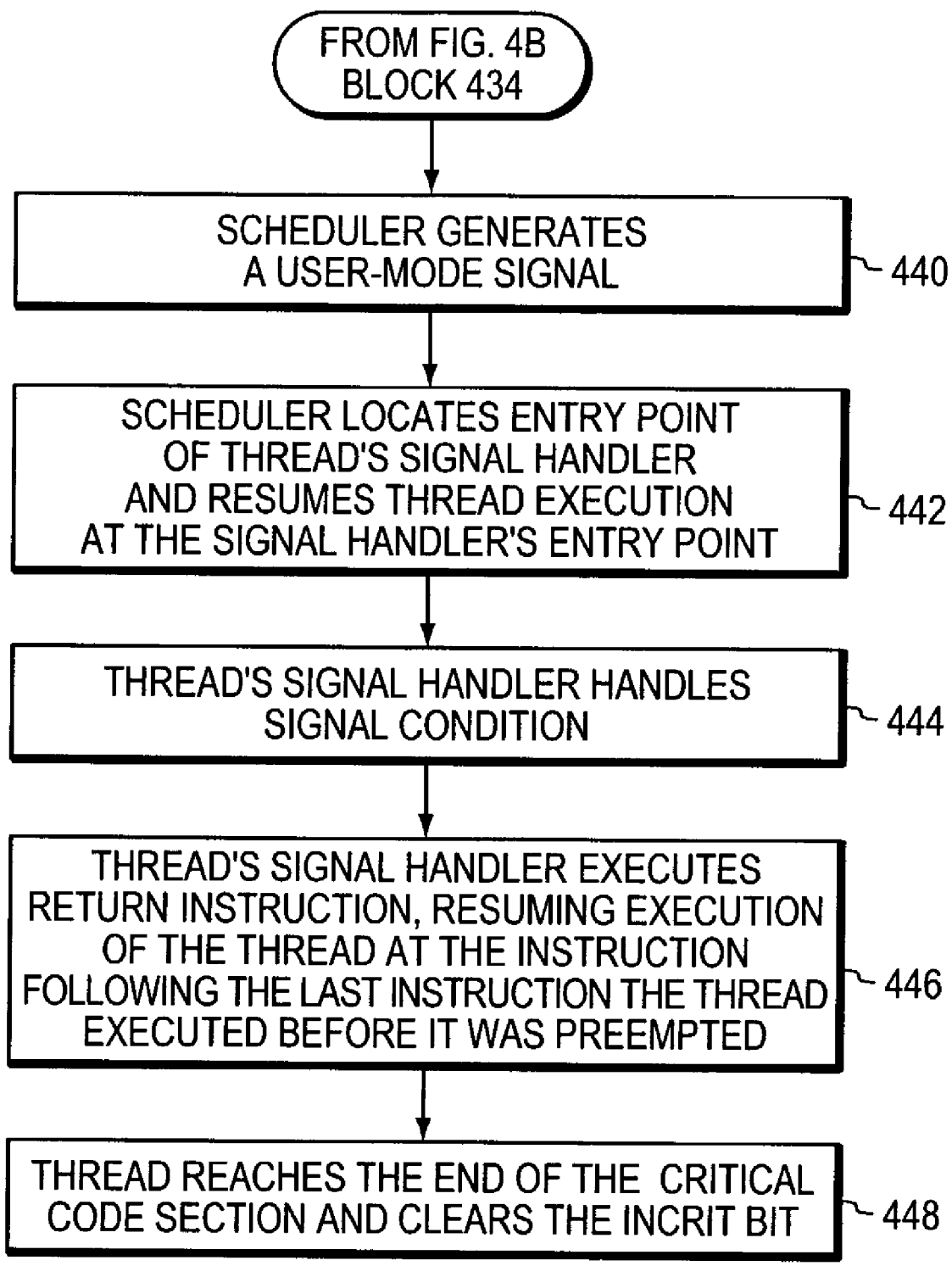

FIGS. 4A–C together form a flow diagram of a scenario that illustrates one way of implementing the present invention. At initialization or at some time during the course of their execution, threads T1 and T2 register a user-mode-signal handler with the operating system, as block 420 indicates. Preferably, the signal handler is a procedure within the thread's code that is designed to receive a signal and handle the condition associated with the signal. The registration might include calling a system service and passing the signal handler's entry point as an input parameter.

Now suppose that thread T1 finishes a non-critical code section 510a (FIG. 5) and enters a critical code section 520a. As FIG. 4A's block 422 indicates, thread T1 sets an indicator, such as a bit in its processor status word (PSW) that we will call "INCRIT," to indicate that it is currently executing a critical code section. When thread T1 reaches the end of its time slot 560a, the processor receives an interrupt, as block 424 indicates. The interrupt indicates that the time slot for thread T1 has ended.

In response to the interrupt, the operating system pre-empts thread T1, as block 426 indicates. It saves various state information in the memory 287, including the PSW, PC, and nPC values associated with thread T1. The scheduler then selects the next thread to run, as block 428 indicates, in accordance with its scheduling algorithm. It performs the operations necessary to prepare the selected thread to run, including, as block 432 indicates, restoring any saved state associated with the selected thread. Let us assume that it selects thread T2 as the next thread to run.

As block 434 indicates, the scheduler 265 next determines whether thread T2's PSW's INCRIT bit is set. In accordance with the present invention, though, it does this without employing a thread-resumption operation specifically modified to make that determination. FIG. 6 is a listing of a code fragment that illustrates one way of employing a software approach to making this determination. Lines 602, 604, 606, 608, 610, and 618 are conventional SPARC™ assembly-language instructions, and lines 601, 614, and 616 are pseudo-code. At line 601, the resuming thread's state is restored. As will be explained presently, lines 602–608 determine whether the INCRIT bit in the restored PSW is set. If so, scheduler execution branches to a handler 620, which posts a signal and resumes the thread's execution at the thread's signal handler. Otherwise, line 610 is executed. This causes the thread to resume execution at the instruction to which the restored PC points.

Specifically, the scheduler places the PSW of thread T2 in register r1, as line 602 indicates. In doing so, it employs a conventional fetch instruction, whose operation code does not inherently deal with the critical-section indicator. Instead, a software-specified parameter, i.e., "tstate," specifies the location that is used to fetch the PSW of thread T2.

At line 604, the scheduler executes a conventional "andcc" instruction that logically is ANDs the contents of r1 with a bit mask that explicitly specifies the INCRIT bit. That instruction also places the result in register g0 and sets the system's condition code to reflect the results of the AND operation, i.e., to indicate whether the INCRIT bit is set. Here again, it is a software-specified mask, not the operations that the operation code inherently specifies, that picks the critical-section indicator.

At line 606, the scheduler executes a conventional branch instruction, which tests the condition code to determine whether the INCRIT bit is set. After execution of the delay-slot instruction set forth in line 608, the scheduler branches to handler 620 if the line-606 operation concluded that the INCRIT bit was set. (The example assumes a delay-slot architecture, in which the instruction located immediately after a branch instruction is executed independently of the branch test's result.) Since thread T2 has not set the INCRIT bit, the scheduler instead proceeds from the delay-slot instruction of line 608 to line 610, where the scheduler uses an unmodified retry instruction to cause thread T2's execution to resume, as block 436 (FIG. 4B) indicates. That instruction causes T2 to resume at the instruction following the last instruction the thread executed before it was preempted, i.e., at the instruction pointed to by the saved PC. Thread T2 then executes throughout FIG. 5's time slot 580a, as FIG. 4B's block 438 indicates.

Thread T2's time slot 580a ends with an interrupt, as FIG. 4A's block 424 indicates. The operating system acknowledges this interrupt and saves the appropriate state associated with thread T2, as block 426 indicates. The scheduler then selects the next thread to run, as block 428 indicates. If the selected thread is thread T1, the scheduler restores thread T1's saved state, including the saved value of thread T1's PSW, as FIG. 4B's block 432 indicates.

As block 434 indicates, the scheduler determines whether the restored PSW's INCRIT bit is asserted. As was stated above, thread T1 was preempted during a critical code section, which it started by setting the INCRIT bit. So, in performing the operations of FIG. 6's lines 602 and 604, the scheduler finds the INCRIT bit asserted. As a result of the branch instruction of line 606, therefore, it jumps from the delay-slot instruction of line 608 to the line-614 instruction, without executing line 610's thread-resumption instruction.

FIG. 4C illustrates the results of taking this branch. As blocks 440 and 442 indicate, the scheduler generates a user-mode signal and resumes thread T1's execution at the entry point of its user-mode signal handler. FIG. 6's lines 614, 616, and 618 set forth the code for these operations. At line 614, the scheduler generates a user-mode signal to indicate that the INCRIT bit is set and that thread T2 has been interrupted. Preferably, the signal is generated by saving a block of information, e.g., a signal stack frame, on the user-mode stack and adjusting the user-mode stack pointer to accommodate this block.

Figure 7:
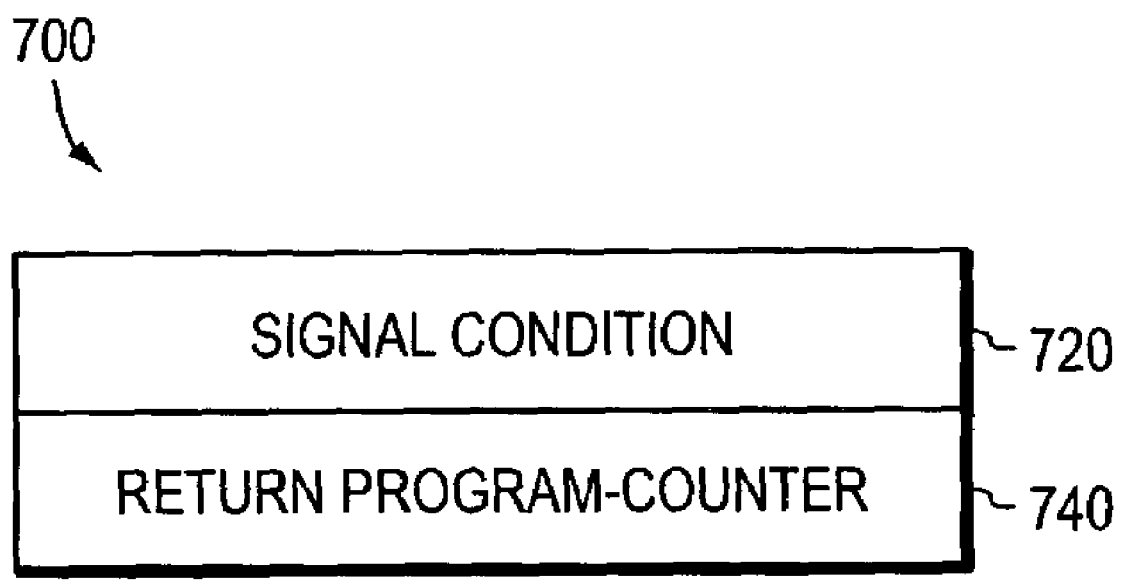
FIG. 7 is a highly schematic block diagram of a stack frame that can be used with the present invention.

FIG. 7 is an illustration of a signal stack frame 700 that can be used for this purpose with the present invention. The signal stack frame 700 includes a signal-condition entry 720 and a return-program-counter entry 740. The signal-condition 720 entry holds the signal condition that has occurred. The return program-counter entry 740 holds the program-counter value, i.e., the saved PC, of the instruction that is to be executed when the thread finishes execution of the code that handles the signal condition. In the case of a delay-slot architecture, a further entry would hold the next-PC value so that, if the PC points to a delay-slot instruction, the thread can continue along the branch specified by the already-executed branch instruction.

Having thus copied thread T2's existing PC value into the stack frame, the scheduler modifies the PC (and next-PC) values, as line 616 indicates, to arrange for control to pass to the user-mode signal handler when the task is resumed. Specifically, scheduler 265 modifies thread T2's saved program counter and next program counter values in thread T2's saved context to point respectively to the entry point and the next instruction after the entry point of T2's signal handler. Preferably, the scheduler has found the handler's entry point by searching a table that associates threads with their registered signal-handler entry points. At line 618, the scheduler then executes a (again, unmodified) retry instruction to switch the execution context from kernel mode to user mode and resume execution of thread T2 at the entry point of thread T2's signal handler.

Now, in contrast to the FIG. 1 code's implementation of the prior application's teachings, which requires only the modified context-switching instruction of line 104 to test the critical-section indicator and branch on it, the approach exemplified by the FIG. 6 code requires five instructions, namely, the instructions of lines 602, 604, 606, 608, and 610. It may therefore seem that the FIG. 6 is more costly operationally, although it does not impose the expense of modifying the processor.

But closer inspection reveals that this apparent superiority of the FIG. 1 approach is illusory. Its test-and-branch operation involves a hardware trap and a switch back from the user-thread context to the kernel context to create the necessary signal and clear the critical-section indicator so that the next context-switch does not trap. These operations are quite expensive; they can take on the order of 200 machine cycles or more.

In contrast, the fetch, mask, branch, and delay-slot operations used in the FIG. 6 code can, in modern super-scalar processors that employ out-of-order execution, often be executed in a single cycle. In fact, the operating system may already contain code that utilizes this same sequence of instructions to test other bits in the PSW when a thread is scheduled to run, so adding a check for the critical-code indicator to these instructions may result in an incremental performance cost that may be next to nothing. (That is, the existing code may use a single instruction to determine whether any bits at all are set, and individual masking operations come into play only if any are indeed set.) True, the FIG. 6 code, too, includes two (expensive) context-switch operations (lines 610 and 618). However, unlike the FIG. 1 code, which causes both context-switch instructions to be executed when a critical section is to resume, the FIG. 6 code causes only one of them to execute. And FIG. 6's context-switch operation is a conventional one, which does not impose the added expense that the hardware trap in FIG. 1's modified context-switch operation. So the present invention makes implementing the prior application's technique less costly operationally—and avoids the cost of a processor design change.

As block 444 indicates, thread T1 executes the signal handler and performs the processing needed to handle the signal condition. This processing may include examining the signal entry 720 on the stack and thereby finding that the reason why control was passed to the signal handler was that the thread was preempted during a critical code section. Having thus found that a critical code section was interrupted, the handler takes whatever action is necessary to ensure consistency in the face of the interruption. The particular nature of the action will be application-specific. Indeed, it will often be specific to the section that was interrupted. The handler may therefore infer the particular interrupted critical code section's identity from the return program-counter value 740 and execute a portion of the handler dedicated to that critical code section.

That handler portion may, for instance, re-read data used by that critical code section, update stack variables and/or registers that depend on those data values, and then return control to the instruction whose address the next-program-counter value contains. Alternatively, if the critical code section is configured to execute as an RAS, the handler may locate the entry point of the critical code section in, for example, a table accessible to the handler and cause the thread's execution to resume at this entry point. The table would contain one or more entries, each of which contains an entry point and a range of program-counter values associated with a particular critical code section contained in the thread's image. This table could be built into the thread's image at the time the image is created, e.g., when the image is compiled and linked. The handler would compare the return-program-counter value 740 with the range of program-counter values associated with each entry and select the entry whose range includes the return-program-counter value 740. The handler then causes the thread's execution to resume at the entry point of the critical code section specified by the selected entry. FIG. 5's reference numeral 530 identifies the time period during which the handler's execution occurs.

As block 446 indicates, the signal handler executes a return instruction, and thread T1's execution continues at the location indicated by the return-program-counter entry 740. At this point, thread T1 resumes execution of the critical code section 520*b* (FIG. 5) that it was executing before it was preempted. When thread T1 reaches the end of the critical section, it clears the INCRIT bit in its PSW, as block 448 indicates. In the illustrated scenario, the thread executes only non-critical code during the remaining portion 510*b* of its time slot 560*b*.

Although the above description describes the invention as being used for synchronization among threads, the invention can also be used in an environment that supports only single-threaded processes. In such an environment, the invention could be used to synchronize different processes' access to shared data. Moreover, the invention can be used in uniprocessor systems with single or multi-threaded processes, multiprocessor systems with single-threaded processes, and multiprocessor systems with multithreaded processes where all the threads are bound to a single processor, i.e., all the threads execute on a single designated processor.

Although the mechanism that the illustrated embodiment's scheduler uses to inform the thread of the critical code's preemption is to build a signal stack frame on the thread's stack, other embodiments of the invention may use other mechanisms for this purpose. For example, the scheduler may convey the signal-condition information to the software task by using inter-task communication mechanisms conventionally provided by the operating system, such as an inter-process or inter-task message, or by otherwise using an area of memory that is accessible to both the scheduler and the software task.

Whereas the thread in the illustrated embodiment retained control of the processor when execution of the illustrated embodiment's signal handler was completed, some embodiments may return control to the scheduler instead, and the scheduler would cause the thread to resume as though no preemption had occurred.

Also, the invention can be practiced without using a user-mode signal handler, as the illustrated embodiment does, to perform the synchronization of the data that the thread uses. The thread's critical code section can itself check for a notification from the signal handler, and, if the notification is present, synchronize the data accordingly. For example, assume a thread enters a critical code section, sets the INCRIT bit, and is preempted. When the scheduler reschedules the thread for execution, it checks the INCRIT bit and proceeds to the thread's signal handler if the bit is asserted, as described above. But the thread's signal handler may not itself include code for performing the synchronization. It may instead merely, say, set a flag that indicates that the thread was preempted. The critical code section itself then checks the flag after it resumes execution; the end of the critical code section, for example, may include code for checking the flag and, if the flag is set, synchronizing the data by, say, rereading the data or branching to the beginning of the critical code section.

And the indicator of whether the software task is in a critical code section need not be a bit located in the thread's PSW, as it is in the illustrated embodiment. Another embodiment of the invention may implement the indicator as a data value stored in a register or memory location that is accessible to both the scheduler and the software task.

Finally, although the illustrated embodiment's determination of the critical-section indicator's state occurs when the software task is being rescheduled, other embodiments of the invention may make that determination for a given thread when that thread reaches the end of its time slot. In such an embodiment, if the indicator is found set, the scheduler would arrange for a signal to be delivered to the thread the next time the thread was scheduled to run.

So the invention can be practiced in a wide range of embodiments and is thus a significant advance in the art.

What is claimed is:

1. For maintaining data synchronization in a computer system configured to execute a scheduler and a software task that executes in a series of time slots an instruction sequence that includes at least one critical code section, a method comprising:
   A) employing the software task to maintain an indicator that indicates whether the task is executing the critical code section;
   B) using the scheduler to preempt the software task;
   C) after the software task has been preempted, employing the scheduler to:
      i) make a determination of whether the indicator is asserted using only software instructions that do not cause a context switch;
      ii) cause the software task to resume by using a thread-resumption instruction whose operation code does not inherently result in such an indicator's being tested and does not use a hardware trap to test the indicator; and
      iii) if the determination is that the indicator is asserted, deliver a signal to the software task; and
   D) employing the software task to perform a recovery procedure in response to the signal if the software task was preempted during the critical code section.

2. A method as defined in claim 1 wherein the scheduler makes the determination of whether the indicator is asserted without employing an instruction whose operation code inherently calls for testing such an indicator.

3. A method as defined in claim 2 wherein the scheduler employs a conventional test-and-branch instruction to make the determination of whether the indicator is asserted.

4. A method as defined in claim 1 wherein the scheduler directs the software task to begin execution at a signal handler associated with the software task if the determination made by the scheduler is that the indicator is asserted.

5. A method as defined in claim 1 wherein the scheduler delivers the signal to the software task by placing the signal in a memory location that is accessible by the software task.

6. A method as defined in claim 5 wherein the memory location is located in a signal stack frame.

7. A method as defined in claim 1 wherein the scheduler uses an inter-task communication mechanism to deliver the signal to the software task.

8. A method as defined in claim 1 wherein the scheduler determines whether the indicator is asserted when the software task reaches the end of its time slot.

9. A method as defined in claim 1 wherein the scheduler determines whether the indicator is asserted when the scheduler is scheduling the software task to run.

10. A method as defined in claim 1 wherein the indicator is a bit in a processor status word that is associated with the software task.

11. A method as defined in claim 1 wherein the recovery procedure comprises: restarting at the beginning of the critical code section.

12. A method as defined in claim 1 wherein the recovery procedure comprises: re-reading data used by the critical code section.

13. A storage medium containing instructions readable by a computer to configure the computer to act as a scheduler that:
   A) preempts at the end of a time slot a software task that is running in the time slot, includes at least one critical code section, and maintains an indicator that indicates whether the task is executing the critical code section;
   B) after the software task has been preempted, makes a determination of whether the indicator is asserted using only software instruction that do not cause a context switch;
   C) after a determination of whether the indicator is asserted, causes the software task to resume by using a thread-resumption instruction whose operation code does not inherently result in such an indicator's being tested and does not use a hardware trap to test the indicator; and
   D) if the determination is that the indicator is asserted, delivers a signal to the software task that will cause the software task to perform a recovery procedure in response to the signal if the software task was preempted during the critical code section.

14. A storage medium as defined in claim 13 wherein the scheduler makes the determination of whether the indicator is asserted without employing an instruction whose operation code inherently calls for testing such an indicator.

15. A storage medium as defined in claim 14 wherein the scheduler employs a conventional test-and-branch instruction to make the determination of whether the indicator is asserted.

16. A storage medium as defined in claim 13 wherein the scheduler directs the software task to begin execution at a signal handler associated with the software task if the determination made by the scheduler is that the indicator is asserted.

17. A storage medium as defined in claim 13 wherein the scheduler delivers the signal to the software task by using a memory location that is accessible by the software task.

18. A storage medium as defined in claim 17 wherein the memory location is located in a signal stack frame.

19. A storage medium as defined in claim 13 wherein the scheduler determines whether the indicator is asserted when the software task reaches the end of its time slot.

20. A storage medium as defined in claim 13 wherein the scheduler determines whether the indicator is asserted when the scheduler is scheduling the software task to run.

21. A storage medium as defined in claim 13 wherein the indicator is a bit in a processor status word that is associated with the software task.

22. An apparatus for maintaining data synchronization in a computer system configured to execute a scheduler and a software task that executes in a series of time slots an instruction sequence that includes at least one critical code section, the apparatus comprising:
A) a memory holding instructions for: i) employing the software task to maintain an indicator that indicates whether the task is executing the critical code section;
ii) using the scheduler to preempt the software task;
iii) after the software task has been preempted, employing the scheduler to:
   a) make a determination of whether the indicator is asserted using only software instructions that do not cause a context switch;
   b) cause the software task to resume by using a thread-resumption instruction whose operation code does not inherently result in such an indicator's being tested and does not use a hardware trap to test the indicator; and
   c) if the determination is that the indicator is asserted, deliver a signal to the software task; and
iv) employing the software task to perform a recovery procedure in response to the signal if the software task was preempted during the critical code section; and B) a central processing unit configured to execute the instructions.

23. An apparatus for maintaining data synchronization in a computer system configured to execute a scheduler and a software task that executes in a series of time slots an instruction sequence that includes at least one critical code section, the apparatus comprising:
A) means for employing the software task to maintain an indicator that indicates whether the task is executing the critical code section;
B) means for using the scheduler to preempt the software task;
C) means, operable after the software task has been preempted, for employing the scheduler to:
   i) make a determination of whether the indicator is asserted using only software instructions that do not cause a context switch;
   ii) cause the software task to resume by using a thread-resumption instruction whose operation code does not inherently result in such an indicator's being tested and does not use a hardware trap to test the indicator; and
   iii) if the determination is that the indicator is asserted, deliver a signal to the software task; and
D) means for employing the software task to perform a recovery procedure in response to the signal if the software task was preempted during the critical code section.

* * * * *